(12) United States Patent  (10) Patent No.: US 12,051,909 B2
Yue et al.  (45) Date of Patent: Jul. 30, 2024

(54) EMERGENCY CONTROL METHOD AND SYSTEM BASED ON SOURCE-LOAD-STORAGE REGULATION AND CUTBACK

(71) Applicants: NANJING UNIVERSITY OF POSTS AND TELECOMMUNICATIONS, Jiangsu (CN); STATE GRID ELECTRIC POWER RESEARCH INSTITUTE CO. LTD, Jiangsu (CN)

(72) Inventors: Dong Yue, Jiangsu (CN); Chunxia Dou, Jiangsu (CN); Zhijun Zhang, Jiangsu (CN); Wenbin Yue, Jiangsu (CN); Xiaohua Ding, Jiangsu (CN); Jianbo Luo, Jiangsu (CN); Yanman Li, Jiangsu (CN); Kun Huang, Jiangsu (CN); Tao Han, Jiangsu (CN)

(73) Assignees: NANJING UNIVERSITY OF POASTS AND TELECOMMUNICATIONS, Jiangsu (CN); STATE GRID ELECTRIC POWER RESEARCH INSTITUTE CO. LTD, Jiangsu (CN)

( * ) Notice: Subject to any disclaimer, the term of this patent is extended or adjusted under 35 U.S.C. 154(b) by 0 days.

(21) Appl. No.: 17/997,367

(22) PCT Filed: Jul. 30, 2021

(86) PCT No.: PCT/CN2021/109630
§ 371 (c)(1),
(2) Date: Nov. 3, 2022

(87) PCT Pub. No.: WO2022/227319
PCT Pub. Date: Nov. 3, 2022

(65) Prior Publication Data
US 2024/0097454 A1  Mar. 21, 2024

(30) Foreign Application Priority Data

Apr. 26, 2021 (CN) .......................... 202110454856.6

(51) Int. Cl.
*H02J 3/48* (2006.01)
*H02J 3/24* (2006.01)
*H02J 3/28* (2006.01)

(52) U.S. Cl.
CPC ................ *H02J 3/48* (2013.01); *H02J 3/241* (2020.01); *H02J 3/28* (2013.01); *H02J 2300/24* (2020.01);
(Continued)

(58) Field of Classification Search
CPC ...... H02J 3/48; H02J 3/241; H02J 3/28; H02J 2300/24; H02J 2300/28; H02J 2300/40
See application file for complete search history.

(56) References Cited

U.S. PATENT DOCUMENTS

2002/0103745 A1\* 8/2002 Lof .......................... F03D 9/257
 705/37
2010/0229544 A1\* 9/2010 Bollinger .................. H02P 9/04
 60/413
(Continued)

FOREIGN PATENT DOCUMENTS

CN 109510247 A 3/2019

OTHER PUBLICATIONS

CNIPA, Notification of a First Office Action for CN202110454856.6, Nov. 23, 2021.
(Continued)

*Primary Examiner* — Ziaul Karim
(74) *Attorney, Agent, or Firm* — Zhigang Ma

(57) ABSTRACT

Disclosed are an emergency control method and system based on source-load-storage regulation and cutback.
(Continued)

According to the method, output power of power generating sources is regulated according to a power regulating quantity and a frequency regulation requirement, an output power compensation and output frequency of each power generating source are maintained within permissible ranges, so that a balance between power supply and demand of a power distribution network is maintained; and standby energy-storage power stations are used to make up a power gap, and an external power supply system is used to assist in making up a power deficiency, so that large load disturbance can be handled make up the power gap.

8 Claims, 3 Drawing Sheets

(52) U.S. Cl.
CPC ....... *H02J 2300/28* (2020.01); *H02J 2300/40* (2020.01)

(56) References Cited

U.S. PATENT DOCUMENTS

| | | | |
|---|---|---|---|
| 2012/0080420 A1* | 4/2012 | Hui | H02J 3/241 315/307 |
| 2014/0025217 A1* | 1/2014 | Jin | H02J 13/0004 700/297 |
| 2019/0004585 A1* | 1/2019 | Halverson | G06F 1/3206 |

OTHER PUBLICATIONS

Nanjing University of Posts and Telecommunications, State Grid Electric Power Research Institute (Applicants), Reply to Notification of a First Office Action for CN202110454856.6, w/ replacement claims, Nov. 24, 2021.

Nanjing University of Posts and Telecommunications, State Grid Electric Power Research Institute (Applicants), Supplemental Reply to Notification of a First Office Action for CN202110454856.6, w/ (allowed) replacement claims, Dec. 22, 2021.

CNIPA, Notification to grant patent right for invention in CN202110454856.6, Jan. 11, 2022.

* cited by examiner

EMERGENCY CONTROL METHOD AND SYSTEM BASED ON SOURCE-LOAD-STORAGE REGULATION AND CUTBACK

FIELD

The invention relates to an emergency control method and system based on source-load-storage regulation and cutback, and belongs to the technical field of emergency frequency regulation of power distribution networks.

BACKGROUND

The frequency characteristics of the power system play an important role in safe and steady operation of the power distribution network. Power generation devices and electrical devices in the power system are designed and manufactured according to rated frequency, and will exhibit their best performance only when operating in the vicinity of the rated frequency. Large fluctuations of the system frequency will compromise the power quality, thus affecting the production process of different departments. When the output of power generators declines due to a drastic decrease of the system frequency, a frequency collapse will be caused. For a long time, generator tripping or load cutback is used to maintain the frequency of the power distribution network within a rated range during actual operation of the power grid. However, pure generator tripping or load cutback is effective in case of small disturbance and will not work anymore in case of long-term load disturbance. So, a novel emergency frequency regulation method is urgently needed.

SUMMARY

The objective of the invention is to overcome the defects of the prior art by providing an emergency control method based on source-load-storage regulation and cutback, which can reasonably regulate the output power compensation of a source-load-storage power distribution network, maintain a balance between power supply and demand in cooperation with generator tripping and load cutback, and keep the output power compensation and output frequency of each power generating source within a permissible range. To fulfill the above objective, the invention is implemented through the following technical solution.

In a first aspect, the invention provides an emergency control method based on source-load-storage regulation and cutback, comprising:

Step 1, obtaining a power regulating quantity $\Delta P_{regulating\ quantity}$;

Step 2, determining a frequency regulation demand: if a system load rises suddenly and grid frequency falls, increasing active power to maintain a balance of supply and demand, and increasing the frequency, an output power compensation and variation being both greater than zero at this moment, and performing Step 3; or, if the system load falls suddenly and the grid frequency rises, decreasing the active power to maintain the balance between supply and demand, and decreasing the frequency, the output power compensation and variation being both less than zero at this moment, and performing Step 9;

Step 3, if a total output power compensation of power generating sources in a power distribution network is greater than the power regulating quantity $\Delta P_{regulating\ quantity}$ and output power and output frequency of each power generating source are less than rated values of a power source, performing Step 4; if the total output power compensation of the power generating sources in the power distribution network is greater than the power regulating quantity $\Delta P_{regulating\ quantity}$ and the output Power of part of the power generating sources is greater than the rated value of the power source, performing Step 5; if the total output power compensation of the power generating sources in the power distribution network is less than the power regulating quantity $\Delta P_{regulating\ quantity}$, using standby energy-storage power stations to compensate a power deficiency of the power distribution network, and performing Step 6; if the total output power compensation of the power generating sources in the power distribution network, is less than the power regulating quantity $\Delta P_{regulating\ quantity}$ and the balance between power supply and demand of the power distribution network is still not maintained after the standby energy-storage power stations are used to compensate the power deficiency, performing Step 7; or, if the total output power compensation of the power generating sources in the power distribution network is less than the power regulating quantity $\Delta P_{regulating\ quantity}$ and the power deficiency of the power distribution network is still not made up by using the standby energy-storage power stations and cutting back removable loads, performing Step 8;

Step 4, if the total output power compensation of the power generating sources in the power distribution network is greater than the power regulating quantity $\Delta P_{regulating\ quantity}$ and the output power and output frequency of the power generating sources are less than the rated values of the power source, making a total output power compensation of the power generating sources participating in output power compensation meet $\Delta P = \Delta P_{regulating\ quantity}$ according to the balance between supply and demand, calculating an output power compensation of each power generating source, and ending the process;

Step 5, if the total output power compensation of the power generating sources in the power distribution network is greater than the power regulating quantity $\Delta P_{regulating\ quantity}$ and the output power of part of the power generating sources is greater than the rated value of the power source, limiting the output power of the power generating sources with the output power being greater than the rated value of the power source, and compensating a remaining power deficiency with the standby energy-storage power stations, making a total output power compensation of the power generating sources participating in power output, excluding the power generating sources with output power being greater than the rated value of the power source, meet $\Delta P = \Delta P_{regulating\ quantity} - \Delta P_{out\text{-}of\text{-}limit\ power\ station}$ according to the balance between supply and demand, calculating an output power compensation of each power generating source, and ending the process;

Step 6, if the total output power compensation of the power generating sources in the power distribution network is less than the power regulating quantity $\Delta P_{regulating\ quantity}$, using the standby energy-storage power stations to compensate a power deficiency of the power distribution network, making a total output power compensation of the power generating sources participating in power output and the standby energy-storage power stations meet $\Delta P = \Delta P_{regulating\ quantity}$ according to the balance between supply and demand, calculating an output power compensation of each power generating source, and ending the process;

Step 7, if the total output power compensation of the power generating sources in the power distribution network is less than the power regulating quantity $\Delta P_{regulating\ quantity}$ and the balance between power supply and demand of the power distribution network is still not maintained after the standby energy-storage power stations are used to compensate the power deficiency, cutting back removable loads, based on a preset cutback principle, making a total output power compensation of the power generating sources and the standby energy-storage power stations after load cutback meet $\Delta P = \Delta P_{regulating\ quantity} - \Delta P_{removable\ load\ f}$ according to the balance between supply and demand, returning to Step 3, repeating this cycle h times, then calculating a total output power compensation $\Delta P = \Delta P_{regulating\ quantity} - \Sigma_{f=1}^{h} \Delta P_{removable\ load\ f}$ of the power generating sources participating in power output and the standby energy-storage power stations after load cutback according to the balance between supply and demand, and ending the process;

Step 8, if the total output power compensation of the power generating sources in the power distribution network is less than the power regulating quantity $\Delta P_{regulating\ quantity}$ and the power deficiency of the power distribution network is still not made up by using the standby energy-storage power stations and cutting back removable loads, using an external power supply system to assist in making up the deficiency, making a total output power compensation of the power generating sources participating in power output, the standby energy-storage power stations and the external power supply system after load cutback meet $\Delta P = \Delta P_{regulating\ quantity} - \Sigma_{d=1}^{l} \Delta P_{removable\ load\ d}$ according to the balance between supply and demand, calculating an output power compensation of each power generating source, and ending the process;

Step 9, if the total output power compensation of the power generating sources in the power distribution network is greater than the power regulating quantity $\Delta P_{regulating\ quantity}$ and the output power and output frequency of each power generating source are less than the rated values of the power source, performing Step 10; or, if the total output power compensation of the power generating sources in the power distribution network is greater than the power regulating quantity $\Delta P_{regulating\ quantity}$ and the output power of part of the power generating sources is greater than the rated value of the power source, performing Step 11;

Step 10, if the total output power compensation of the power generating sources in the power distribution network is greater than the power regulating quantity $\Delta P_{regulating\ quantity}$ and the output power and output frequency of each power generating source are less than the rated values of the power source, making a total output power compensation of the power generating sources meet $\Delta P = \Delta P_{regulating\ quantity}$ according to the balance between supply and demand, calculating an output power compensation of each power generating source, and ending the process; and Step 11, if the total output power compensation of the power generating sources in the power distribution network is greater than the power regulating quantity $\Delta P_{regulating\ quantity}$ and the output power of part of the power generating sources is greater than the rated value of the power source, cutting back the power generating sources with the output power being greater than the rated value of the power source, making a total output power compensation of the power generating sources participating in power output meet $\Delta P = \Delta P_{regulating\ quantity} - \Delta P_{out-of-limit}$ according to the balance between supply and demand, calculating an output power compensation of each power generating source, and ending the process.

In conjunction with the first aspect, further, the power generating sources in the power distribution network comprise micro-grids, photovoltaic power stations and wind power stations, and the power distribution network further comprises energy-storage power stations.

In conjunction with the first aspect, further, response modes of the method comprise active response and passive response, the active response means that the power distribution network actively responds to a frequency fall under large disturbance in an island mode or a weakly-connected mode, and the passive response means that the power distribution network passively responds to an emergency control instruction issued by a major network in a grid-connected mode.

In conjunction with the first aspect, further, in the active response mode of a source-grid-load-storage networked cloud decision control system, an actively calculated power gap required for stable operation of the system under an island condition is used as the power regulating quantity $\Delta P_{regulating\ quantity}$; and in the passive response mode of the source-grid-load-storage networked cloud decision control system, a power gap required for stable operation of the major network and issued by the major network is used as the power regulating quantity $\Delta P_{regulating\ quantity}$.

In conjunction with the first aspect, further, the power gap required for stable operation of the system under the island condition is actively calculated according to the following formula:

$$\Delta P_{actively\ calculated\ power\ difference} = \Sigma_{a=1}^{x} \Delta P_{micro-grid\ a} + \Sigma_{j=1}^{y} \Delta P_{photovoltaic\ power\ station\ j} + \Sigma_{i=1}^{z} \Delta P_{wind\ power\ station\ i} + \Sigma_{b=1}^{m} \Delta P_{energy-storage\ power\ station\ b} \quad (1).$$

In formula (1), $\Sigma_{a=1}^{x} \Delta P_{micro-grid\ a}$ is an output power compensation of the micro-grids, and is expressed by the following formula:

$$\sum_{a=1}^{x} \Delta P_{micro-grid\ a} = \frac{\sum_{a=1}^{x} \Delta f}{k_{micro-grid\ a}}. \quad (2)$$

In formula (2), $\Sigma_{a=1}^{x} \Delta f$ is a difference between output frequency of the micro-grids and rated grid frequency, and $k_{micro-grid\ a}$ is a frequency regulation coefficient of the micro grids.

In formula (1), $\Sigma_{j=1}^{y} \Delta P_{photovoltaic\ power\ station\ j}$ is an output power compensation of the photovoltaic power stations, and is expressed by the following formula.

$$\sum_{j=1}^{y} \Delta P_{photovoltaic\ power\ station\ j} = \frac{\sum_{j=1}^{y} \Delta f}{k_{photovoltaic\ power\ station\ j}} \quad (3)$$

In formula (3), $\Sigma_{a=1}^{x} \Delta f$ is the difference between the output frequency of the micro-grids and the rated grid frequency, and $k_{photovoltaic\ power\ station\ j}$ is a frequency regulation coefficient of the photovoltaic power stations.

In formula (1), $\sum_{j=1}^{z} P_{wind\ power\ station\ i}$ is an output power compensation of the wind power stations, and is expressed by the following formula.

$$\sum_{i=1}^{z} \Delta P_{wind\ power\ station\ i} = \frac{\sum_{i=1}^{z} \Delta f}{k_{wind\ power\ station\ i}} \quad (4)$$

In formula (4), $\sum_{a=1}^{x} \Delta f$ is the difference between the output frequency of the micro grids and the rated grid frequency, and $k_{wind\ power\ station\ i}$ is a frequency regulation coefficient of the wind power stations.

In formula (1), $\sum_{b=1}^{m} \Delta P_{energy\text{-}storage\ power\ station\ b}$ an output power compensation of the energy-storage power stations, and is expressed by the following formula:

$$\sum_{b=1}^{m} \Delta P_{energy\text{-}station\ power\ station\ b} = \frac{\sum_{b=1}^{m} \Delta f}{k_{energy\text{-}storage\ power\ station\ b}} \quad (5)$$

In formula (5), $\sum_{a=1}^{x} \Delta f$ the difference between the output frequency of the micro-grids and the rated grid frequency, and $k_{energy\text{-}storage\ power\ station\ b}$ is a frequency regulation coefficient of the energy-storage power stations.

In a second aspect, the invention provides a source-grid-load-storage networked cloud decision control system, comprising a cloud intelligent analysis and decision platform, a source-grid-load-storage networked cooperative control system, and a source-grid-load-storage cooperative control intelligent terminal.

The cloud intelligent analysis and decision platform has a terminal connected to a power grid dispatching system and a terminal connected to the source-grid-load-storage networked cooperative control system, and the source-grid-load-storage networked cooperative control system is connected to the source-grid-load-storage cooperative control intelligent terminal.

The cloud intelligent analysis and decision platform is able to directly respond to grid frequency/voltage disturbance and fault information to make an analysis and decision, the source-grid-load-storage networked cooperative control system sends the decision to the source-grid-load-storage cooperative control intelligent terminal; the cloud intelligent analysis and decision platform is also able to respond to a management and regulation instruction issued by the power grid dispatching system to make an analysis and decision, and the source-grid-load-storage networked cooperative control system sends the decision to the source-grid-load-storage cooperative control intelligent terminal.

The source-grid-load-storage cooperative control intelligent terminal is connected to a distributed power unit, a distributed micro-grid unit, a distributed energy-storage device unit and a distributed load aggregation unit for executing a decision issued by the source-grid-load-storage cooperative control intelligent terminal.

In conjunction with the second aspect, in an active response mode, the system actively responds to the grid frequency/voltage disturbance and fault information to provide analysis and decision support by means of the cloud intelligent analysis and decision platform, and the source-grid-load-storage networked cooperative control system sends a decision command to the distributed units to be executed.

In conjunction with the second aspect, further, in a passive response mode, the system provide analysis and decision support by means of the cloud intelligent analysis and decision platform according to a management and regulation strategy issued by the power grid dispatching system, and the source-grid-load-storage networked cooperative control system sends a decision command to the distributed units to be executed.

In conjunction with the second aspect, further, the source-grid-load-storage networked cooperative control system comprises an emergency regulation and cutback module, and the emergency regulation and cutback module is used to perform the steps of the method in the first aspect.

Compared with the prior art, the emergency control method based on source-load-storage regulation and cutback has the following beneficial effects:

According to the invention, the output power of the power generating sources is regulated according to the power regulating quantity and the frequency regulation requirement, and the output power compensation and output frequency of each power generating source are maintained within permissible ranges, so that a balance between power supply and demand of the power distribution network is maintained.

According to the invention, standby energy-storage power stations can be used to make up a power gap, and an external power supply system can be used to assist in making up a power deficiency, so that the method can adapt to large load disturbance to make up the power gap.

According to the invention, by using standby energy-storage power stations, cutting back power generating sources with power being greater than the rated value of a power source, cutting back removable loads, and using an external power supply system to assist in making up a power deficiency, a power gap caused by long-term load disturbance can be made up, long-term load disturbance can be handled, and the output power compensation and output frequency of each power generating source can be maintained within permissible ranges.

DETAILED DESCRIPTION

The invention will be further described below in conjunction with the accompanying drawings. The following embodiments are merely used to explain the technical solutions of the invention more clearly, and should not be construed as limiting the protection scope of the invention.

Embodiment 1

Figure 1:
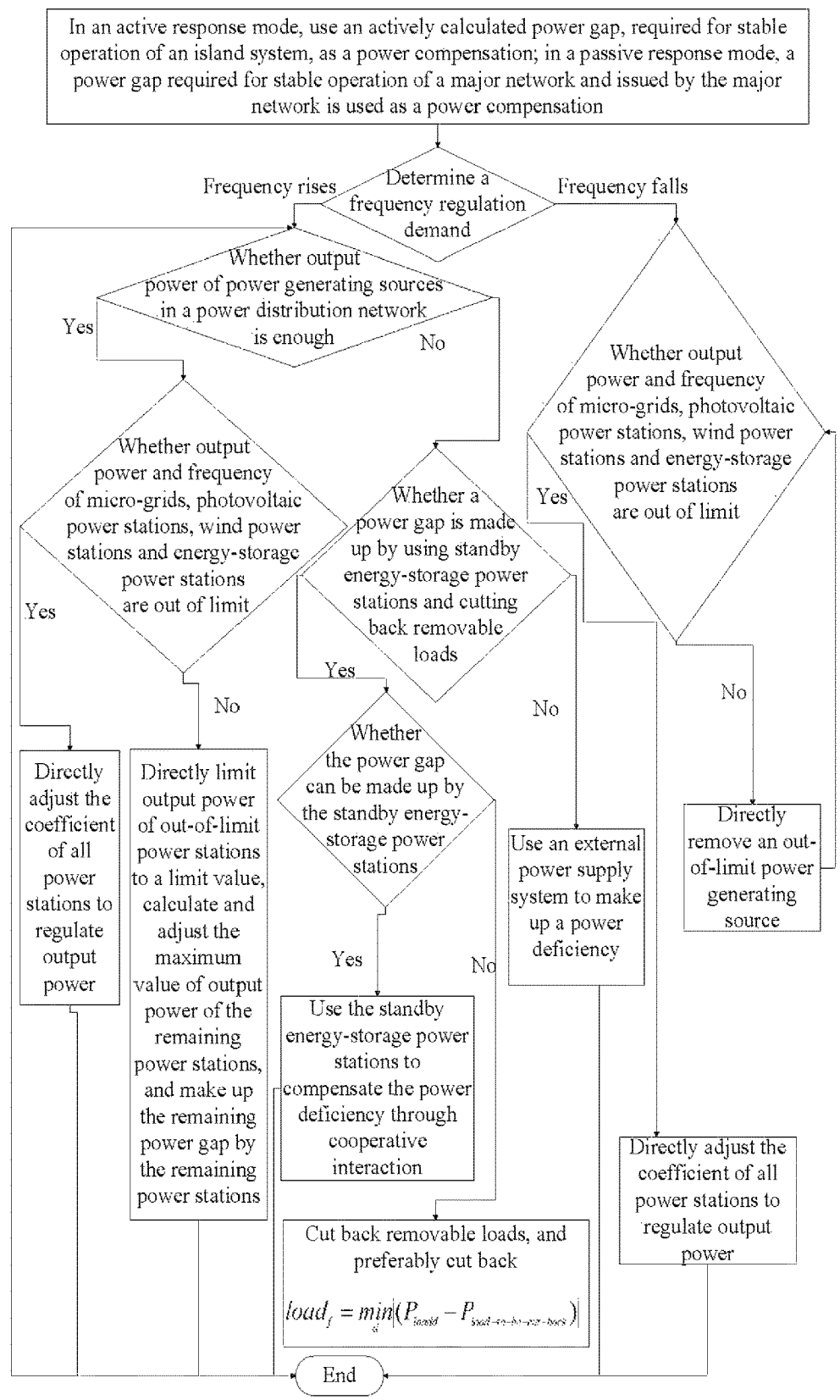
FIG. 1 is a flow diagram of an emergency control method based on, source-load-storage regulation and cutback in Embodiment 1 of the invention.

As shown in FIG. 1, this embodiment provides an emergency control method based on source-load-storage regulation and cutback. Power generating sources in a power distribution network comprise micro-grids, photovoltaic power stations, wind power stations, and the power distribution network further comprises energy-storage power stations. Response modes of the method comprise active response and passive response, the active response means that the power distribution network actively responds to a frequency fall under large disturbance in an island mode or a weakly-connected mode, and the passive response means that the power distribution network passively responds to an emergency control instruction issued by a major network in a grid-connected mode.

Step 1: a power regulating quantity $\Delta P_{regulating\ quantity}$ is obtained.

Power regulating quantity $\Delta P_{regulating\ quantity}$: in an active response mode of a source-grid-load-storage networked cloud decision control system, an actively calculated power gap required for stable operation of the system under an island condition is used as the power regulating quantity $\Delta P_{regulating\ quantity}$; and in the passive response mode of the source-grid-load-storage networked cloud decision control system, a power gap required for stable operation of the major network and issued by the major network is used as the power regulating quantity $\Delta P_{regulating\ quantity}$.

Specifically, in the active response mode of the source-grid-load-storage networked cloud decision control system, the power gap required for stable operation of the system under the island condition and used as the Power regulating quantity $\Delta P_{regulating\ quantity}$ is actively calculated according to the following formula:

$$\Delta P_{actively\ calculated\ power\ gap} = \Sigma_{a=1}^{x} \Delta P_{micro\text{-}grid\ a} + \Sigma_{j=1}^{y} \Delta P_{photovoltaic\ power\ station\ j} + E_{j=1}^{z} \Delta P_{wind\ power\ station\ i} + \Sigma_{b=1}^{m} \Delta P_{energy\text{-}storage\ power\ station\ b} \quad (1).$$

In formula (1), $\Sigma_{a=1}^{x} \Delta P_{micro\text{-}grid\ a}$ is an output power compensation of the micro-grids, x is the number of the micro grids, and $\Sigma_{a=1}^{x} \Delta P_{micro\text{-}grid\ a}$ is expressed by the following formula:

$$\sum_{a=1}^{x} \Delta P_{micro\text{-}grid\ a} = \frac{\sum_{a=1}^{x} \Delta f}{k_{micro\text{-}grid\ a}}. \quad (2)$$

In formula (2), $\Sigma_{a=1}^{x} \Delta f$ is a difference between output frequency of the micro-grids and rated grid frequency, and $k_{micro\text{-}grid\ a}$ is a frequency regulation coefficient of the micro-grids.

In formula (1), $\Sigma_{j=1}^{y} \Delta P_{photovoltaic\ power\ station\ j}$ is an output power compensation of the photovoltaic power stations, y is the number of the photovoltaic power stations, and $\Sigma_{j=1}^{y} \Delta P_{photovoltaic\ power\ station\ j}$ is expressed by the following formula:

$$\sum_{j=1}^{y} \Delta P_{photovoltaic\ power\ station\ j} = \frac{\sum_{j=1}^{y} \Delta f}{k_{photovoltaic\ power\ station\ j}}. \quad (3)$$

In formula (3), $\Sigma_{a=1}^{x} \Delta f$ is the difference between the output frequency of the micro grids and the rated grid frequency, and $k_{photovoltaic\ power\ station\ j}$ is a frequency regulation coefficient of the photovoltaic power stations.

In formula (1), $\Sigma_{j=1}^{z} \Delta P_{wind\ power\ station\ i}$ is an output power compensation of the wind power stations, z is the number of the wind power stations, and $\Sigma_{j=1}^{z} \Delta P_{wind\ power\ station\ i}$ is expressed by the following formula:

$$\sum_{i=1}^{z} \Delta P_{wind\ power\ station\ i} = \frac{\sum_{i=1}^{z} \Delta f}{k_{wind\ power\ station\ i}}. \quad (4)$$

In formula (4), $\Sigma_{a=1}^{x} \Delta f$ is the difference between the output frequency of the micro-grids and the rated grid frequency, and $k_{wind\ power\ station\ i}$ is a frequency regulation coefficient of the wind power stations.

In formula (1), $\Sigma_{b=1}^{m} \Delta P_{energy\text{-}storage\ power\ station\ b}$ is an output power compensation of the energy-storage power stations, m is the number of the energy-storage power stations, and $\Sigma_{b=1}^{m} \Delta P_{energy\text{-}storage\ power\ station\ b}$ is expressed by the following formula:

$$\sum_{b=1}^{m} \Delta P_{energy\text{-}storage\ power\ station\ b} = \frac{\sum_{b=1}^{m} \Delta f}{k_{energy\text{-}storage\ power\ station\ b}}. \quad (5)$$

In formula (5), $\Sigma_{a=1}^{x} \Delta f$ is the difference between the output frequency of the micro-grids and the rated grid frequency, and $k_{energy\text{-}storage\ power\ station\ b}$ is a frequency regulation coefficient of the energy-storage power stations.

Step 2: a frequency regulation demand is determined: if a system load rises suddenly and grid frequency falls, active power is increased to maintain a balance between supply and demand, and the frequency is increased, an output power compensation and variation are both greater than zero at this moment, and Step 3 is, performed; or, if the system load falls suddenly and the grid frequency rises, the active power is decreased to maintain the balance between supply and demand, and the frequency is decreased, the output power compensation and variation are both less than zero at this moment, and Step 9 is performed.

Step 3: if a total output power compensation of the power generating sources in a power distribution network is greater than the power regulating quantity $\Delta P_{regulating\ quantity}$ and output power and output frequency of each power generating source are less than rated values of a power source, Step 4 is performed; if the total output power compensation of the power generating sources in the power distribution network is greater than the power regulating quantity $\Delta P_{regulating\ quantity}$ and the output power of part of the power generating sources is greater than the rated value of the power source, Step 5 is performed-, if the total output power compensation of the power generating sources in the power distribution network is less than the power regulating quantity $\Delta P_{regulating\ quantity}$, standby energy-storage power stations are used to compensate a power deficiency of the power distribution network, and Step 6 is performed; if the total output power compensation of the power generating sources in the power distribution network is less than the power regulating quantity $\Delta P_{regulating\ quantity}$ and the balance between power supply and demand of the power distribution network is still not maintained after the standby energy-storage power stations are used to compensate the power deficiency, Step 7 is performed; or, if the total output power compensation of the power generating sources in the power distribution network is less than the power regulating quantity $\Delta P_{regulating\ quantity}$ and the power deficiency of the power distribution network is still not made up by using the standby energy-storage power stations and cutting back removable loads, Step 8 is performed.

Step 4: if the total output power compensation of the power generating sources in the power distribution network is greater than the power regulating quantity $\Delta P_{regulating\ quantity}$ and the output power and output frequency of each power generating source are less than the rated values of the power source, that is:

$$\Sigma_{i=1}^{x}\Delta P_{wind\ i.max}+\Sigma_{j=1}^{y}\Delta P_{photovoltaic\ j.max}+\\ \Sigma_{a=1}^{z}\Delta P_{micro\text{-}grid\ a.max}+\Sigma_{b=1}^{m}\\ \Delta P_{energy\text{-}storage\ b.max}>\Delta P_{regulating\ quantity} \quad (6).$$

In formula (6), $\Delta P_{wind\ i.max}$ is a maximum value of the output power compensation of an $i^{th}$ wind power station under the constraint of a rated power value, $\Delta P_{photovoltaic\ j.max}$ is a maximum value of the output power compensation of a $j^{th}$ photovoltaic power station under the constraint of the rated power value, $P_{micro\text{-}grid\ a.max}$ is a maximum value of the output power compensation of an $a^{th}$ micro-grid under the constraint of the rated power value, and $\Delta P_{energy\text{-}storage\ b.max}$ is a maximum value of the output power compensation of a $b^{th}$ energy-storage power station under the constraint of the rated power value.

Interfaces of the power stations meet $\Delta f=k\Delta P$, in which $\Delta f$ is a difference between the grid frequency and, rated frequency, so $$K_{wind\ power\ station\ 1}\Delta P_{wind\ power\ station\ 1}=\cdots=\\ K_{wind\ power\ station\ z}\Delta P_{wind\ power\ station\ z}=\\ K_{photovoltaic\ power\ station\ 1}\\ \Delta P_{photovoltaic\ station\ 1}=\cdots=\\ K_{photovoltaic\ power\ station\ y}\\ \Delta P_{photovoltaic\ power\ station\ y}=K_{micro\text{-}grid\ 1}\\ \Delta P_{micro\text{-}grid\ 1}=\cdots=K_{micro\text{-}grid\ x}\\ \Delta P_{micro\text{-}grid\ x}=K_{energy\text{-}storage\ power\ station\ 1}\\ \Delta P_{energy\text{-}storage\ power\ station\ 1}=\cdots=\\ K_{energy\text{-}storage\ power\ station\ m}\\ \Delta P_{energy\text{-}storage\ power\ station\ m} \quad (7).$$

In formula (7), $K_{wind\ power\ station\ i}$ and $\Delta P_{wind\ power\ station\ i}$ are the frequency regulation coefficient and output power compensation of the $i^{th}$ wind power station respectively, $K_{photovoltaic\ power\ station\ j}$ and $\Delta P_{photovoltaic\ power\ station\ j}$ are the frequency regulation coefficient and output power compensation of the $j^{th}$ photovoltaic power station respectively, $K_{micro\text{-}grid\ a}$ and $\Delta P_{micro\text{-}grid\ a}$ are the frequency regulation coefficient and output power compensation of the $a^{th}$ micro-grid respectively, and $K_{energy\text{-}storage\ power\ station\ b}$ and $\Delta P_{energy\text{-}storage\ power\ station\ b}$ are the frequency regulation coefficient and output power compensation of the $b^{th}$ energy-storage power station respectively.

Wherein, the power regulating quantity $\Delta P_{regulating\ quantity}$ is expressed by the following formula:

$$\Sigma_{i=1}^{x}\Delta P_{wind\ i}+\Sigma_{j=1}^{y}\Delta P_{photovoltaic\ j}+\Sigma_{a=1}^{z}\\ \Delta P_{micro\text{-}grid\ a}+\Sigma_{b=1}^{m}\\ \Delta P_{energy\text{-}storage\ b}=\Delta P_{regulating\ quantity} \quad (8)$$

In formula (8), $\Delta P_{wind\ i}$ is the output power compensation of the $i^{th}$ wind power station, $\Delta P_{photovoltaic\ j}$ is the output power compensation of the $j^{th}$ photovoltaic power station, $\Delta P_{micro\text{-}grid\ a}$ is the output power compensation of the $a^{th}$ micro-grid, and $\Delta P_{energy\text{-}storage\ b}$ is the output power compensation of the $b^{th}$ energy-storage power station.

A total output power compensation of the power generating sources participating in output power compensation is made to meet $\Delta P=\Delta P_{regulating\ quantity}$ according to the balance between supply and demand, and the output power compensation of each power generating source is calculated according to the following formula:

$$\Delta P_r = \frac{\prod_{\substack{s=1\\s\neq r}}^{u} K_s}{\prod_{t=1}^{u}\prod_{\substack{s=1\\s\neq r}}^{u} K_s} \Delta P. \quad (9)$$

In formula (9), $\Delta P_r$ is the output power compensation of an $r^{th}$ power generating source, $K_s$ is the frequency regulation coefficient of an $s^{th}$ power generating source, and u is the total number of the power generating sources participating in power generation.

In formula (6) and formula (8), x is the number of the micro-grids, y is the number of the photovoltaic power stations, z is the number of wind power stations, and m is the number of the energy-storage power stations, and x, y, z and m meet:

$$u=x+y+z+m \quad (10)$$

In formula (10), u is the total number of the power generating sources participating in output power compensation.

Step 5: if the total output power compensation of the power generating sources in the power distribution network is greater than the power regulating quantity $\Delta P_{regulating\ quantity}$ and the output power of part of the power generating sources is greater than the rated value of the power source, the output power of the power generating sources with the output power being greater than the rated value of the power source is limited, and a remaining power deficiency is made up by the standby energy-storage power stations.

For example, if the first wind power station is out of limit, that is, the output power of the first wind power station is greater than the rated value of the power source, the interfaces of the power stations meet $\Delta f=k\Delta P$, in which $\Delta f$ is the difference between the grid frequency and the rated frequency, so:

$$K_{wind\ power\ station\ 1}\\ \Delta P_{wind\ power\ station\ 1\text{-}out\text{-}of\text{-}limit}=\cdots=\\ K_{wind\ power\ station\ z}\Delta P_{wind\ power\ station\ z}=\\ K_{photovoltaic\ power\ station\ 1}\\ \Delta P_{photovoltaic\ power\ station\ 1}=\cdots=\\ K_{photovoltaic\ power\ station\ y}\\ \Delta P_{photovoltaic\ power\ station\ y}=K_{micro\text{-}grid\ 1}\\ \Delta P_{micro\text{-}grid\ 1}=\cdots=K_{micro\text{-}grid\ x}\\ \Delta P_{micro\text{-}grid\ x}=K_{energy\text{-}storage\ power\ station\ 1}\\ \Delta P_{energy\text{-}storage\ power\ station\ 1}=\cdots=\\ K_{energy\text{-}storage\ power\ station\ m}\\ \Delta P_{energy\text{-}storage\ power\ station\ m}=\\ K_{standby\ energy\text{-}storage\ power\ station\ 1}\\ \Delta P_{standby\ energy\text{-}storage\ power\ station\ 1}=\cdots=\\ K_{standby\ energy\text{-}storage\ power\ station\ n}\\ \Delta P_{standby\ energy\text{-}storage\ power\ station\ n} \quad (11).$$

In formula (11), $K_{wind\ power\ station\ i}$ and $\Delta P_{wind\ power\ station\ i}$ are the frequency regulation coefficient and output power compensation of the $i^{th}$ wind power station respectively, $\Delta P_{wind\ power\ station\ 1\text{-}out\text{-}of\text{-}limit}$ is a maximum value of the output power compensation of the out-of-limit wind power station under the constraint of the rated power value, $K_{photovoltaic\ power\ station\ j}$ and $\Delta P_{photovoltaic\ power\ station\ j}$ are the frequency regulation coefficient and output power compensation of the $j^{th}$ photovoltaic power station respectively, $K_{micro\text{-}grid\ a}$ and $\Delta P_{micro\text{-}grid\ a}$ are the frequency regulation coefficient and output power compensation of the $a^{th}$ micro-grid respectively, and $K_{energy\text{-}storage\ power\ station\ b}$ and $\Delta P_{energy\text{-}storage\ power\ station\ b}$ are the frequency regulation coefficient and output power compensation of the $b^{th}$ energy-storage power station respectively.

Wherein, the power regulating quantity $\Delta P_{regulating\ quantity}$ is expressed by the following formula:

$$\sum_{i=1}^{x}\Delta P_{wind\ i}+\sum_{j=1}^{y}\Delta P_{photovoltaic\ j}+\sum_{a=1}^{z}\Delta P_{micro\text{-}grid\ a}+\sum_{b=1}^{m}\Delta P_{energy\text{-}storage\ b}+\sum_{c=1}^{n}\Delta P_{standby\ energy\text{-}storage\ c}=\Delta P_{regulating\ quantity} \quad (12)$$

In formula (12), $\Delta P_{wind\ i}$ is the output power compensation of the $i^{th}$ wind power station, $\Delta P_{photovoltaic\ j}$ is the output power compensation of the $j^{th}$ photovoltaic power station, $\Delta P_{micro\text{-}grid\ a}$ is the output power compensation of the $a^{th}$ micro-grid, $\Delta P_{energy\text{-}storage\ b}$ is the output power compensation of the $b^{th}$ energy-storage power station, and $\Delta P_{standby\ energy\text{-}storage\ c}$ is the output power compensation of the $c^{th}$ standby energy-storage power station.

A total output power compensation of the power generating sources participating in power output, excluding the power generating sources with output power being greater than the rated value of the power source, is made to meet $\Delta P=\Delta P_{regulating\ quantity}-\Delta P_{wind\ power\ station\ 1\ out\text{-}of\text{-}limit}$ according to the balance between supply and demand, and the output power compensation of each power generating source is calculated according to the following formula:

$$\Delta P_r = \frac{\prod_{\substack{s=1\\s\ne r}}^{u} K_s}{\sum_{t=1}^{u}\prod_{\substack{s=1\\s\ne t}}^{u} K_s}\Delta P \quad (13)$$

In formula (13), $\Delta P_r$ is the output power compensation of the $r^{th}$ power generating source, $K_s$ is the frequency regulation coefficient of the $s^{th}$ power generating source, and $u$ is the total number of the power generating sources participating in power generation.

In formula (12), $x$ is the number of the micro-grids, $y$ is the number of the photovoltaic power stations, $z$ is the number of wind power stations, and $m$ is the number of the energy-storage power stations, and $x$, $y$, $z$ and $m$ meet:

$$u=x+y+z+m+n-1 \quad (14)$$

In formula (14), $u$ is the total number of the power generating sources participating in output power compensation.

Step 6: when the total output power compensation of the power generating sources in the power distribution network is less than the power regulating quantity $\Delta P_{regulating\ quantity}$, the standby energy-storage power stations are used to compensate a power deficiency of the power distribution network, so $$K_{wind\ power\ station\ 1}\Delta P_{wind\ power\ station\ 1}=\ldots=K_{wind\ power\ station\ z}\Delta P_{wind\ power\ station\ z}=$$
$$K_{photovoltaic\ power\ station\ 1}\Delta P_{photovoltaic\ power\ station\ 1}=\ldots=K_{photovoltaic\ power\ station\ y}\Delta P_{photovoltaic\ power\ station\ y}=K_{micro\text{-}grid\ 1}\Delta P_{micro\text{-}grid\ 1}=\ldots=K_{micro\text{-}grid\ x}\Delta P_{micro\text{-}grid\ x}=K_{energy\text{-}storage\ power\ station\ 1}\Delta P_{energy\text{-}storage\ power\ station\ 1}=\ldots=K_{energy\text{-}storage\ power\ station\ m}\Delta P_{energy\text{-}storage\ power\ station\ m}=K_{standby\ energy\text{-}storage\ power\ station\ 1}\Delta P_{standby\ energy\text{-}storage\ power\ station\ 1}=\ldots=K_{standby\ energy\text{-}storage\ power\ station\ n}\Delta P_{standby\ energy\text{-}storage\ power\ station\ n} \quad (15)$$

In formula (15), $K_{wind\ power\ station\ i}$ and $\Delta P_{wind\ power\ station\ i}$ are the frequency regulation coefficient and output power compensation of the $i^{th}$ wind power station respectively, $K_{photovoltaic\ power\ station\ j}$ an $\Delta P_{photovoltaic\ power\ station\ j}$ are the frequency regulation coefficient and output power compensation of the $j^{th}$ photovoltaic power station respectively, $K_{micro\text{-}grid\ a}$ and $\Delta P_{micro\text{-}grid\ a}$ are the frequency regulation coefficient and output power compensation of the $a^{th}$ micro-grid respectively, $K_{energy\text{-}storage\ power\ station\ b}$ and $\Delta P_{energy\text{-}storage\ power\ station\ b}$ are frequency regulation coefficient and output power compensation of a $b^{th}$ standby energy-storage power station respectively, and $K_{standby\ energy\text{-}storage\ power\ station\ c}$ and $\Delta P_{standby\ energy\text{-}storage\ power\ station\ c}$ are a frequency regulation coefficient and output power compensation of the $c^{th}$ standby energy-storage power station respectively.

Wherein, the power regulating quantity $\Delta P_{regulating\ quantity}$ is expressed by the following formula:

$$\sum_{i=1}^{x}\Delta P_{wind\ i}+\sum_{j=1}^{y}\Delta P_{photovoltaic\ j}+\sum_{a=1}^{z}\Delta P_{micro\text{-}grid\ a}+\sum_{b=1}^{m}\Delta P_{energy\text{-}storage\ b}+\sum_{c=1}^{n}\Delta P_{standby\ energy\text{-}storage\ c}=\Delta P_{regulating\ quantity} \quad (16)$$

In formula (16), $P_{wind\ i}$ is the output power compensation of the $i^{th}$ wind power station, $\Delta P_{photovoltaic\ j}$ is the output power compensation of the $j^{th}$ photovoltaic power station, $\Delta P_{micro\text{-}grid\ a}$ is the output power compensation of the $a^{th}$ micro-grid, $\Delta P_{energy\text{-}storage\ b}$ is the output power compensation of the $b^{th}$ energy-storage power station, and $\Delta P_{standby\ energy\text{-}storage\ c}$ is the output power compensation of the $c^{th}$ standby energy-storage power station.

A total output power compensation of the power generating sources participating, in power output and the standby energy-storage power stations is made to meet $\Delta P=\Delta P_{regulating\ quantity}$ according to the balance between supply and demand, and the output power compensation of each power generating source is calculated according to the following formula:

$$\Delta P_r = \frac{\prod_{\substack{s=1\\s\ne r}}^{u} K_s}{\sum_{t=1}^{u}\prod_{\substack{s=1\\s\ne t}}^{u} K_s}\Delta P. \quad (17)$$

In formula (17), $\Delta P_r$ is the output power compensation of the $r^{th}$ power generating source, $K_s$ is the frequency regulation coefficient of the $s^{th}$ power generating source, and $u$ is the total number of the power generating sources participating in power generation.

In formula (16), $x$ is the number of the micro-grids, $y$ is the number of the photovoltaic power stations, $z$ is the number of wind power stations, m is the number of the energy-storage power stations, n is the number of the energy-storage power stations, and $x$, $y$, $z$, $m$ and $n$ meet:

$$u=x+y+z+m+n \quad (18)$$

In formula (18), $u$ is the total number of the power generating sources participating in power output.

Step 7: if the total output power compensation of the power generating sources in the power distribution network is less than the power regulating quantity $\Delta P_{regulating\ quantity}$ and the balance between power supply and demand of the power distribution network is still not maintained after the standby energy-storage power stations are used to compensate the power deficiency, removable loads are cut back based on a preset cutback principle, wherein the preset cutback principle is expressed as:

$$aload_f = \min_d |(P_{load\ d} - P_{load\ to\ be\ cut\ back})|. \quad (19)$$

In formula (19), aload$_f$ is a load to be cut back, and $P_{loudd}$ is power distributed to a $d^{th}$ load by the power distribution network.

A total output power compensation of the power generating sources and the standby energy-storage power stations after load cutback is made to meet $\Delta P=\Delta P_{regulating\ quantity}-\Delta P_{removable\ load\ f}$ according to the balance between supply and demand, and Step 3 is performed.

This cycle is repeated h times, and the interfaces of the power stations meet $\Delta f=k\Delta P$, in which $\Delta f$ is a difference between the grid frequency and the rated frequency, so:

$$K_{wind\ power\ station\ 1}\Delta P_{wind\ power\ station\ 1}=\cdots=$$
$$K_{wind\ power\ station\ z}\Delta P_{wind\ power\ station\ z}=$$
$$K_{photovoltaic\ power\ station\ 1}$$
$$\Delta P_{photovoltaic\ power\ station\ 1}=\cdots=$$
$$K_{photovoltaic\ power\ station\ y}$$
$$\Delta P_{photovoltaic\ power\ station\ y}=K_{micro-grid\ 1}$$
$$\Delta P_{micro-grid\ 1}=\cdots=K_{micro-grid\ x}$$
$$\Delta P_{micro-grid\ x}=K_{energy-storage\ power\ station\ 1}$$
$$\Delta P_{energy-storage\ power\ station\ 1}=\cdots=$$
$$K_{energy-storage\ power\ station\ m}$$
$$\Delta P_{energy-storage\ power\ station\ m}=$$
$$K_{standby\ energy-storage\ power\ station\ 1}$$
$$\Delta P_{standby\ energy-storage\ power\ station\ 1}=\cdots=$$
$$K_{standby\ energy-storage\ power\ station\ n}$$
$$\Delta P_{standby\ energy-storage\ power\ station\ n} \quad (20).$$

In formula (20), $K_{wind\ power\ station\ i}$ and $\Delta P_{wind\ power\ station\ i}$ are the frequency regulation coefficient and output power compensation of the $i^{th}$ wind power station respectively, $K_{photovoltaic\ power\ station\ j}$ and $\Delta P_{photovoltaic\ power\ station\ j}$ are the frequency regulation coefficient and output power compensation of the $j^{th}$ photovoltaic power station respectively, $K_{micro-grid\ a}$ and $\Delta P_{micro-grid\ a}$ are the frequency regulation coefficient and output power compensation of the $a^{th}$ micro-grid respectively, $K_{energy-storage\ power\ station\ b}$ and $\Delta P_{energy-storage\ power\ station\ b}$ are the frequency regulation coefficient and output power compensation of the $b^{th}$ standby energy-storage power station respectively, and $K_{standby\ energy-storage\ power\ station\ c}$ and $\Delta P_{standby\ energy-storage\ power\ station\ c}$ are the frequency regulation coefficient and output power compensation of the $c^{th}$ standby energy-storage power station respectively.

Wherein, the power regulating quantity $\Delta P_{regulating\ quantity}$ is expressed by the following formula:

$$\sum_{i=1}^{x}\Delta P_{wind\ i}+\sum_{j=1}^{y}\Delta P_{photovoltaic\ j}+\sum_{a=1}^{z}\Delta P_{micro-grid\ a}+ \quad (21)$$
$$\sum_{b=1}^{m}\Delta P_{energy-storage\ b}+\sum_{c=1}^{n}\Delta P_{standby\ energy\ storage\ c}=$$
$$\Delta P_{regulating\ quantity}-\sum_{f=1}^{h}\Delta P_{removable\ load\ f}$$

In formula (21), $P_{wind\ i}$ is the output power compensation of the $i^{th}$ wind power station, $\Delta P_{photovoltaic\ j}$ is the output power compensation of the $j^{th}$ photovoltaic power station, $\Delta P_{micro-grid\ a}$ is the output power compensation of the $a^{th}$ micro-grid, $\Delta P_{energy-storage\ b}$ is the output power compensation of the $b^{th}$ energy-storage power station, $\Delta P_{standby\ energy-storage\ c}$ is the output power compensation of the $c^{th}$ standby energy-storage power station, and $\Delta P_{removable\ load\ f}$ is the output power compensation of the $j^{th}$ removable load.

A total output power compensation of the power generating sources participating in power output and the standby energy-storage power stations is made to meet $\Delta P=\Delta P_{regulating\ quantity}-\Sigma_{f=1}^{h}\Delta P_{removable\ load\ f}$ according to the balance between supply and demand, and the output power of each power generating source is calculated according to the following formula:

$$\Delta P_r=\frac{\prod_{\substack{s=1\\s\neq r}}^{u}K_s}{\sum_{t=1}^{u}\prod_{\substack{s=1\\s\neq t}}^{u}K_s}\Delta P \quad (22)$$

In formula (22), $\Delta P_r$ is the output power compensation of the $r^{th}$ power generating source, $K_s$ is the frequency regulation coefficient of the $s^{th}$ power generating source, and u is the total number of the power generating sources participating in power generation.

In formula (21), x is the number of the micro-grids, y is the number of the photovoltaic power stations, z is the number of wind power stations, m is the number of the energy-storage power stations, n is the number of the energy-storage power stations, and x, y, z, m and n meet:

$$u=x+y+z+m+n \quad (23)$$

In formula (23), u is the total number of the power generating sources participating in power output.

Step 8: if the total output power compensation of the power generating sources in the power distribution network is less than the power regulating quantity $\Delta P_{regulating\ quantity}$ and the power deficiency of the power distribution network is still not made up by using the standby energy-storage power stations and cutting, back removable loads, an external power supply system is used to make up the deficiency, so:

$$K_{wind\ power\ station\ 1}\Delta P_{wind\ power\ station\ 1}=\cdots=$$
$$K_{wind\ power\ station\ z}\Delta P_{wind\ power\ station\ z}=$$
$$K_{photovoltaic\ power\ station\ 1}$$
$$\Delta P_{photovoltaic\ power\ station\ 1}=\cdots=$$
$$K_{photovoltaic\ power\ station\ y}$$
$$\Delta P_{photovoltaic\ power\ station\ y}=K_{micro-grid\ 1}$$
$$\Delta P_{micro-grid\ 1}=\cdots=K_{micro-grid\ x}$$
$$\Delta P_{micro-grid\ x}=K_{energy-storage\ power\ station\ 1}$$
$$\Delta P_{energy-storage\ power\ station\ 1}=\cdots=$$
$$K_{energy-storage\ power\ station\ m}$$
$$\Delta P_{energy-storage\ power\ station\ m}=$$
$$K_{standby\ energy-storage\ power\ station\ 1}$$
$$\Delta P_{standby\ energy-storage\ power\ station\ 1}=\cdots=$$
$$K_{standby\ energy-storage\ power\ station\ n}$$
$$\Delta P_{standby\ energy-storage\ power\ station\ n}=$$
$$K_{external\ power\ supply}\Delta P_{external\ power\ supply} \quad (24).$$

In formula (24), $K_{wind\ power\ station\ i}$ and $\Delta P_{wind\ power\ station\ i}$ are the frequency regulation coefficient and output power compensation of the $i^{th}$ wind power station respectively, $K_{photovoltaic\ power\ station\ j}$ and $\Delta P_{photovoltaic\ power\ station\ j}$ are the frequency regulation coefficient and output power compensation of the $j^{th}$ photovoltaic power station respectively, $K_{micro-grid\ a}$ and $\Delta P_{micro-grid\ a}$ are the frequency regulation coefficient and output power compensation of the $a^{th}$ micro-grid respectively, $K_{energy-storage\ power\ station\ b}$ and $\Delta P_{energy-storage\ power\ station\ b}$ are the frequency regulation coefficient and output power compensation of the $b^{th}$ standby energy-storage power station respectively, $K_{standby\ energy-storage\ power\ station\ c}$ and $\Delta P_{standby\ energy-storage\ power\ station\ c}$ are the frequency regulation coefficient and output power compensation of the $c^{th}$ standby energy-storage power station respectively, and $K_{external\ power\ supply}$ and $\Delta P_{external\ power\ supply}$ are the frequency regulation coefficient and output power compensation of the external power supply system respectively.

Wherein, the power regulating quantity $\Delta P_{regulating\ quantity}$ is expressed by the following formula:

$$\Delta P_{wind} + \Delta P_{photovoltaic} + P_{controllable\ source}$$
$$\Sigma_{i=1}^{x}\Delta P_{wind\ i} + \Sigma_{j=1}^{y}\Delta P_{photovoltaic\ j} +$$
$$\Sigma_{a=1}^{z}\Delta P_{micro-grid\ a} +$$
$$\Sigma_{b=1}^{m}\Delta P_{energy-storage\ b} +$$
$$\Sigma_{c=1}^{n}\Delta P_{standby\ energy-storage\ c} +$$
$$\Delta P_{external\ power\ supply} = \Delta P_{regulating\ quantity} -$$
$$\Sigma_{d=1}^{l}\Delta P_{removable\ load\ d} \quad (25)$$

In formula (25), $P_{wind\ i}$ is the output power compensation of the $i^{th}$ wind power station, $\Delta P_{photovoltaic\ j}$ is the output power compensation of the $j^{th}$ photovoltaic power station, $\Delta P_{micro-grid\ a}$ is the output power compensation of the $a^{th}$ micro-grid, $\Delta P_{energy-storage\ b}$ is the output power compensation of the $b^{th}$ energy-storage power station, $\Delta P_{standby\ energy-storage\ c}$ is the output power compensation of the $c^{th}$ standby energy-storage power station, $\Delta P_{external\ power\ supply}$ is the output power compensation of the external power supply system, and $\Delta P_{removable\ load\ f}$ is the output power compensation of the $f^{th}$ removable load.

A total output power compensation of the power generating sources participating, in power output, the standby energy-storage power stations and the external power supply system after load cutback is made to meet $\Delta P = \Delta P_{regulating\ quantity} - \Sigma_{d=1}^{l}\Delta P_{removable\ load\ d}$ according to the balance between supply and demand, and the output power compensation of each power generating source is calculated according to the following formula:

$$\Delta P_r = \frac{\prod_{\substack{s=1 \\ s \neq r}}^{u} K_s}{\sum_{t=1}^{u}\prod_{\substack{s=1 \\ s \neq t}}^{u} K_s} \Delta P \quad (26)$$

In formula (26), $\Delta P_r$ is the output power compensation of the $r^{th}$ power generating source, $K_s$ is the frequency regulation coefficient of the $s^{th}$ power generating source, and u is the total number of the power generating sources participating in power generation.

In formula (25), x is the number of the micro-grids, y is the number of the photovoltaic power stations, z is the number of wind power stations, m is the number of the energy-storage power stations, n is the number of the energy-storage power stations, and x, y z, m and n meet:

$$u = x + y + z + m + n + 1 \quad (27)$$

In formula (27), u is the total number of the power generating sources participating in power output.

Step 9: if the total output power compensation of the power generating sources in the power distribution network is greater than the power regulating quantity $\Delta P_{regulating\ quantity}$ and the output power and output frequency of each power generating source are less than the rated values of the power source, Step 10 is performed; or, if the total output power compensation of the power generating sources in the power distribution network is greater than the power regulating quantity $\Delta P_{regulation\ quantity}$ and the output power of part of the power generating sources is greater than the rated value of the power source, Step 11 is performed.

Step 10: if the total output power compensation of the power generating sources in the power distribution network is greater than the power regulating quantity $\Delta P_{regulating\ quantity}$ and the output power and output frequency of each power generating source are less than the rated values of the power source, that is:

$$|\Sigma_{i=1}^{x}\Delta P_{wind\ i.max} + \Sigma_{j=1}^{y}\Delta P_{photovoltaic\ j.max} +$$
$$\Sigma_{a=1}^{z}\Delta P_{micro-grid\ a.max} +$$
$$\Sigma_{b=1}^{m}\Delta P_{energy-storage\ b.max}| \geq |\Delta P_{regulating\ quantity}| \quad (28)$$

In formula (28), $\Delta P_{wind\ i.max}$ is a maximum value of the output power compensation of the $i^{th}$ wind power station under the constraint of a rated power value, $\Delta P_{photovoltaic\ j.max}$ is a maximum value of the output power compensation of the $j^{th}$ photovoltaic power station under the constraint of the rated power value, $P_{micro-grid\ a.max}$ is a maximum value of the output power compensation of the $a^{th}$ micro-grid under the constraint of the rated power value, and $\Delta P_{energy-storage\ b.max}$ is a maximum value of the output power compensation of the $b^{th}$ energy-storage power station under the constraint of the rated power value.

Interfaces of the power stations meet $\Delta f = k\Delta P$, in which $\Delta f$ is a difference between the grid frequency and rated frequency, so:

$$K_{wind\ power\ station\ 1}\Delta P_{wind\ power\ station\ 1} = \cdots =$$
$$K_{wind\ power\ station\ z}\Delta P_{wind\ power\ station\ z} =$$
$$K_{photovoltaic\ power\ station\ 1}$$
$$\Delta P_{photovoltaic\ power\ station\ 1} = \cdots =$$
$$K_{photovoltaic\ power\ station\ y}$$
$$\Delta P_{photovoltaic\ power\ station\ y} = K_{micro-grid\ 1}$$
$$\Delta P_{micro-grid\ 1} = \cdots = K_{micro-grid\ x}$$
$$\Delta P_{micro-grid\ x} = K_{energy-storage\ power\ station\ 1}$$
$$\Delta P_{energy-storage\ power\ station\ 1} = \cdots =$$
$$K_{energy-storage\ power\ station\ m}$$
$$\Delta P_{energy-storage\ power\ station\ m} \quad (29)$$

In formula (29), $K_{wind\ power\ station\ i}$ and $\Delta P_{wind\ power\ station\ i}$ are the frequency regulation coefficient and output power compensation of the $i^{th}$ wind power station respectively, $K_{photovoltaic\ power\ station\ j}$ and $\Delta P_{photovoltaic\ power\ station\ j}$ are the frequency regulation coefficient and output power compensation of the $j^{th}$ photovoltaic power station respectively, $K_{micro-grid\ a}$ and $\Delta P_{micro-grid\ a}$ are the frequency regulation coefficient and output power compensation of the $a^{th}$ micro-grid respectively, and $K_{energy-storage\ power\ station\ b}$ and $\Delta P_{energy-storage\ power\ station\ b}$ are the frequency regulation coefficient and output power compensation of the $b^{th}$ energy-storage power station respectively.

Wherein, the power regulating quantity $\Delta P_{regulating\ quantity}$ is expressed by the following formula:

$$\Sigma_{i=1}^{x}\Delta P_{wind\ i} + \Sigma_{j=1}^{y}\Delta P_{photovoltaic\ j} + \Sigma_{a=1}^{z}\Delta P_{micro-grid\ a} + \Sigma_{b=1}^{m}\Delta_{energy-storage\ b} = \Delta P_{regulating\ quantity} \quad (30)$$

In formula (30), $\Delta P_{wind\ i}$ is the output power compensation of the $i^{th}$ wind power station, $\Delta P_{photovoltaic\ j}$ is the output power compensation of the $j^{th}$ photovoltaic power station, $\Delta P_{micro-grid\ a}$ is the output power compensation of the a $a^{th}$ micro-grid, and $\Delta P_{energy-storage\ b}$ is the output power compensation of the $b^{th}$ energy-storage power station.

A total output power compensation of the power generating sources is made to meet $\Delta P = \Delta P_{regulating\ quantity}$ according to the balance between supply and demand, and the output power compensation of each power generating source is calculated according to the following formula:

$$\Delta P_r = \frac{\prod_{\substack{s=1 \\ s \neq r}}^{u} K_s}{\sum_{t=1}^{u}\prod_{\substack{s=1 \\ s \neq t}}^{u} K_s} \Delta P \quad (31)$$

In formula (31), $\Delta P_r$ is the output power compensation of the $r^{th}$ power generating source, $K_s$ is the frequency regulation coefficient of the $s^{th}$ power generating source, and u is the total number of the power generating sources participating in power generation.

In formula (28) and formula (30), x is the number of the micro-grids, y is the number of the photovoltaic power stations, z is the number of wind power stations, and m is the number of the energy-storage power stations, and x, y, z and m meet:

$$u=x+y+z+m \quad (32)$$

In formula (32), u is the total number of the power generating sources participating in output power compensation.

Step 11: if the total output power compensation of the power generating sources in the power distribution network is greater than the power regulating quantity $\Delta P_{regulating\ quantity}$ and the output power of part of the power generating sources is greater than the rated value of the power source, Step 10 is performed; for example, if the first wind power station is removed, the interfaces of the power stations meet $\Delta f = k\Delta P$, in which $\Delta f$ is the difference between the grid frequency and the rated frequency, so:

$$K_{wind\ power\ station\ 2}\Delta P_{wind\ power\ station\ 2} = \cdots = K_{wind\ power\ station\ z}\Delta P_{wind\ power\ station\ z} = K_{photovoltaic\ power\ station\ 1}\Delta P_{photovoltaic\ power\ station\ 1} = \cdots = K_{photovoltaic\ power\ station\ y}\Delta P_{photovoltaic\ power\ station\ y} = K_{micro-grid\ 1}\Delta P_{micro-grid\ 1} = \cdots = K_{micro-grid\ x}\Delta P_{micro-grid\ x} = K_{energy-storage\ power\ station\ 1}\Delta P_{energy-storage\ power\ station\ 1} = \cdots = K_{energy-storage\ power\ station\ m}\Delta P_{energy-storage\ power\ station\ m} \quad (33)$$

In formula (33), $K_{wind\ power\ station\ i}$ and $\Delta P_{wind\ power\ station\ i}$ are the frequency regulation coefficient and output power compensation of the $i^{th}$ wind power station respectively, $K_{photovoltaic\ power\ station\ j}$ and $\Delta P_{photovoltaic\ power\ station\ j}$ are the frequency regulation coefficient and output power compensation of the $j^{th}$ photovoltaic power station respectively. $K_{micro-grid\ a}$ and $\Delta P_{micro-grid\ a}$ are the frequency regulation coefficient and output power compensation of the $a^{th}$ micro-grid respectively, and $K_{energy-storage\ power\ station\ b}$ and $\Delta P_{energy-storage\ power\ station\ b}$ are the frequency regulation coefficient and output power compensation of the $b^{th}$ energy-storage power station respectively.

Wherein, the power regulating quantity $\Delta P_{regulating\ quantity}$ is expressed by the following formula:

$$\Sigma_{i=2}^{x}\Delta P_{wind\ i} + \Sigma_{j=1}^{y}\Delta P_{photovoltaic\ j} + \Sigma_{a=1}^{z}\Delta P_{micro-grid\ a} + \Sigma_{b=1}^{m}\Delta P_{energy-storage\ b} = \Delta P_{regulating\ quantity} - \Delta P_{wind\ 1-out-of-limit} \quad (34)$$

In formula (34), $\Delta P_{wind\ i}$ is the output power compensation of the $i^{th}$ wind power station, $\Delta P_{photovoltaic\ j}$ is the output power compensation of the $j^{th}$ photovoltaic power station, $\Delta P_{micro-grid\ a}$ is the output power compensation of the $a^{th}$ micro-grid, and $\Delta P_{energy-storage\ b}$ is the output power compensation of the $b^{th}$ energy-storage power station.

A total output power compensation of the power generating sources participating in power output is made to meet $\Delta P = \Delta P_{regulating\ quantity} - \Delta P_{out-of-limit}$ according to the balance between supply and demand, and the output power compensation of each power generating source is calculated according to the following formula:

$$\Delta P_r = \frac{\prod_{\substack{s=1 \\ s \neq r}}^{u} K_s}{\sum_{t=1}^{u}\prod_{\substack{s=1 \\ s \neq t}}^{u} K_s} \Delta P \quad (35)$$

In formula (35), $\Delta P_r$ is the output power compensation of the $r^{th}$ power generating source, $K_s$ is the frequency regulation coefficient of the $s^{th}$ power generating source, and u is, the total number of the power generating sources participating in power generation.

In formula (34), x is the number of the micro-grids, y is the number of the photovoltaic power stations, z is the number of wind power stations, m is the number of the energy-storage power stations, n is the number of the energy-storage power stations, and x, y, z, m and n meet:

$$u=x+y+z+m+n-1 \quad (36).$$

In formula (36), u is the total number of the power generating sources participating in power output.

Embodiment 2

Figure 2:
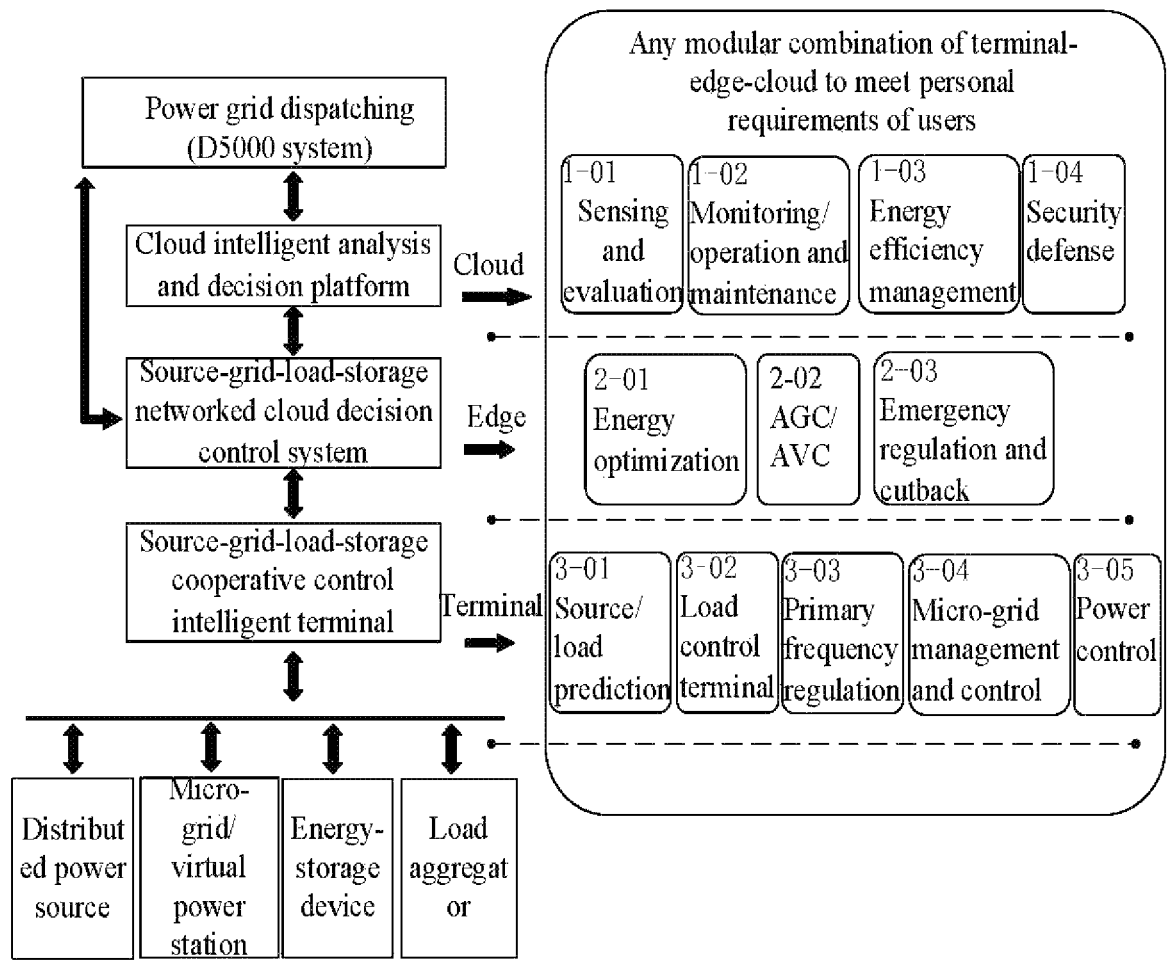
FIG. 2 is a schematic diagram of a source-grid-load-storage networked cloud decision control system in Embodiment 2 of the invention.

As shown in FIG. 2, this embodiment discloses a source-Did-load-storage networked cloud decision control system, comprising a cloud intelligent analysis and decision platform, a source-grid-load-storage networked cooperative control system, and a source-grid-load-storage cooperative control intelligent terminal.

The cloud intelligent analysis and decision platform has a terminal connected to a power grid dispatching system and a terminal connected to the source-grid-load-storage networked cooperative control system, and the source-grid-load-storage networked cooperative control system is connected to the source-grid-load-storage cooperative control intelligent terminal.

The cloud intelligent analysis and decision platform is able to directly respond to grid frequency/voltage disturbance and fault information to make an analysis and decision, the source-grid-load-storage networked cooperative control system sends the decision to the source-grid-load-storage cooperative control intelligent terminal; the cloud intelligent analysis and decision platform is also able to respond to a management and regulation instruction issued by the power grid dispatching system to make an analysis and decision, and the source-grid-load-storage networked cooperative control system sends the decision to the source-grid-load-storage cooperative control intelligent terminal.

The source-grid-load-storage cooperative control intelligent terminal is connected to a distributed power unit, a distributed micro-grid unit a distributed energy-storage device unit and a distributed load aggregation unit for executing a decision issued by the source-grid-load-storage cooperative control intelligent terminal.

Figure 3:
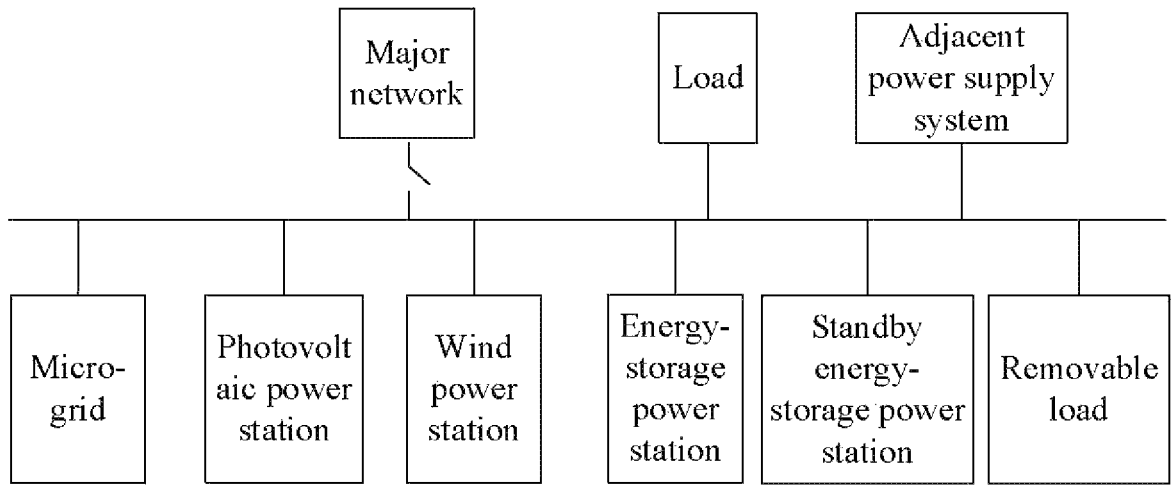
FIG. 3 is a schematic diagram of a power system in an active response mode of the source-grid-load-storage networked cloud decision control system in Embodiment 2 of the invention.

In the active response mode, the source-grid-load-storage networked cloud decision control system actively responds to the grid frequency/voltage disturbance and fault information to provide analysis and decision support by means of the cloud intelligent analysis and decision platform, and the source-grid-load-storage networked cooperative control system sends a decision command to the distributed units to be executed. As shown in FIG. 3 which is a schematic diagram of a power system in the active response mode, the power system comprises a major network, loads, an adjacent power supply system, micro-grids, photovoltaic power stations, wind power stations, energy-storage power stations, standby energy-storage power stations, and removable loads, and the all units, except the major network, are connected.

Figure 4:
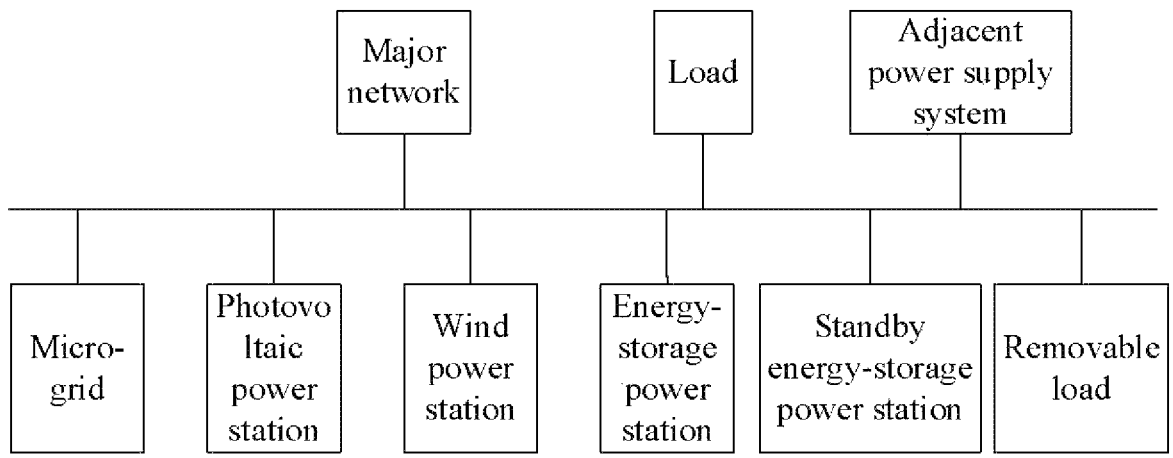
FIG. 4 is a schematic diagram of the power system in a passive response mode of the source-grid-load-storage networked cloud decision control system in Embodiment 2 of the invention.

In a passive response mode, the source-grid-load-storage networked cloud decision control system provide analysis and decision support by means of the cloud intelligent analysis and decision platform according to a management and regulation strategy issued by the power grid dispatching system, and the source-grid-load-storage networked cooperative control system sends a decision command to the distributed units to be executed. As shown in FIG. 4 which is a schematic diagram of a power system in the passive response mode the power system comprises a major network, loads, an adjacent power supply system, micro-grids, photovoltaic power stations, wind power stations, energy-storage power stations, standby energy-storage power stations, and removable loads, and the all units, except the major network, are connected.

The source-grid-load-storage, networked cooperative control system comprises an emergency regulation and cutback module, and the emergency regulation and cutback module is used to perform the steps of the method in Embodiment 1.

The above embodiments are merely preferred ones of the invention. It should be noted that various improvements and transformations may be made by those ordinarily skilled in the art without departing from the technical principle of the invention, and all these improvements and transformations should fall within the protection scope of the invention.

What is claimed is:

1. An emergency control method based on source-load-storage regulation and cutback, comprising:

step 1, obtaining a power regulating quantity $\Delta P_{regulating\ quantity}$;

step 2, determining a frequency regulation demand; wherein the frequency regulation demand comprises: a first frequency regulation demand indicating an increase of a grid frequency and a second frequency regulation demand indicating a decrease of the grid frequency; in response to the first frequency regulation demand, performing step 3, and an output power compensation and variation being both greater than zero; in response to the second frequency regulation demand, performing step 9, and the output power compensation and variation being both less than zero;

step 3, obtaining five working states of power generating sources in a power distribution network; wherein the five working states of the power generating sources in the power distribution network comprise:

a total output power compensation of the power generating sources in the power distribution network being greater than the power regulating quantity $\Delta P_{regulating\ quantity}$ and output power and output frequency of each power generating source being less than rated values of a power source;

the total output power compensation of the power generating sources in the power distribution network being greater than the power regulating quantity $\Delta P_{regulating\ quantity}$ and the output power of part of the power generating sources being greater than the rated value of the power source;

the total output power compensation of the power generating sources in the power distribution network being less than the power regulating quantity $\Delta P_{regulating\ quantity}$, using standby energy-storage power stations to compensate a power deficiency of the power distribution network;

the total output power compensation of the power generating sources in the power distribution network being less than the power regulating quantity $\Delta P_{regulating\ quantity}$ and the balance between power supply and demand of the power distribution network being still not maintained after the standby energy-storage power stations being used to compensate the power deficiency; and the total output power compensation of the power generating sources in the power distribution network being less than the power regulating quantity $\Delta P_{regulating\ quantity}$ and the power deficiency of the power distribution network being still not made up by using the standby energy-storage power stations and cutting back removable loads, performing Step 8;

step 4, making, in response to the total output power compensation of the power generating sources in the power distribution network being greater than the power regulating quantity $\Delta P_{regulating\ quantity}$ and the output power and the output frequency of each power generating source being less than the rated values of the power source, a total output power compensation of the power generating sources participating in output power compensation meet $\Delta P=\Delta P_{regulating\ quantity}$ according to the balance between supply and demand, calculating an output power compensation of each power generating source;

step 5, limiting, in response to the total output power compensation of the power generating sources in the power distribution network being greater than the power regulating quantity $\Delta P_{regulating\ quantity}$ and the output power of part of the power generating sources being greater than the rated value of the power source, the output power of the power generating sources with the output power being greater than the rated value of the power source, and compensating a remaining power deficiency with the standby energy-storage power stations, making a total output power compensation of the power generating sources participating in power output, excluding the power generating sources with output power being greater than the rated value of the power source, meet $\Delta P=\Delta P_{regulating\ quantity}-\Delta P_{out-of-limit\ power\ station}$ according to the balance between supply and demand, calculating the output power compensation of each power generating source, and ending the process;

step 6, making, in response to the total output power compensation of the power generating sources in the power distribution network being less than the power regulating quantity $\Delta P_{regulating\ quantity}$ and use standby energy-storage power stations to compensate a power deficiency of the power distribution network, a total output power compensation of the power generating sources participating in power output and the standby energy-storage power stations meet $\Delta P=\Delta P_{regulating\ quantity}$ according to the balance between supply and demand, calculating the output power compensation of each power generating source;

step 7, cutting back, in response to the total output power compensation of the power generating sources in the power distribution network being less than the power regulating quantity $\Delta P_{regulating\ quantity}$ and the balance between power supply and demand of the power distribution network being still not maintained after the standby energy-storage power stations being used to compensate the power deficiency, removable loads based on a preset cutback principle, making a total output power compensation of the power generating sources and the standby energy-storage power stations after load cutback meet $\Delta P=\Delta P_{regulating\ quantity}-\Delta P_{removable\ load\ f}$ according to the balance between supply and demand, returning to step 3, repeating this cycle h times, then calculating a total output power compensation $\Delta P=\Delta P_{regulating\ quantity}-\Sigma_{f=1}^{h}\Delta P_{removable\ load\ f}$ of the power generating sources participating in power output and the standby energy-storage power stations after load cutback according to the balance between supply and demand;

step 8, using, in response to the total output power compensation of the power generating sources in the power distribution network being less than the power regulating quantity $\Delta P_{regulating\ quantity}$ and the power deficiency of the power distribution network being still not made up by using the standby energy-storage power stations and cutting back removable loads, an external power supply system to assist in making up the deficiency, making a total output power compensation of the power generating sources participating in power output, the standby energy-storage power stations and the external power supply system after load cutback meet $\Delta P = \Delta P_{regulating\ quantity} - \Sigma_{d=1}^{l} \Delta P_{removable\ load\ a}$ according to the balance between supply and demand, calculating the output power compensation of each power generating source;

step 9, obtaining two working states of the power generating sources in the power distribution network; wherein the two working states comprise:

the total output power compensation of the power generating sources in the power distribution network being greater than the power regulating quantity $\Delta P_{regulating\ quantity}$ and the output power and output frequency of each power generating source being less than the rated values of the power source; and the total output power compensation of the power generating sources in the power distribution network being greater than the power regulating quantity $\Delta P_{regulating\ quantity}$ and the output power of part of the power generating sources being greater than the rated value of the power source;

step 10, making, in response to the total output power compensation of the power generating sources in the power distribution network being greater than the power regulating quantity $\Delta P_{regulating\ quantity}$ and the output power and output frequency of each power generating source being less than the rated values of the power source, a total output power compensation of the power generating sources meet $\Delta P = \Delta P_{regulating\ quantity}$ according to the balance between supply and demand, calculating the output power compensation of each power generating source; and step 11, cutting back, in response to the total output power compensation of the power generating sources in the power distribution network being greater than the power regulating quantity $\Delta P_{regulating\ quantity}$ and the output power of part of the power generating sources being greater than the rated value of the power source, the power generating sources with the output power being greater than the rated value of the power source, making a total output power compensation of the power generating sources participating in power output meet $\Delta P = \Delta P_{regulating\ quantity} - \Delta P_{out-of-limit}$ according to the balance between supply and demand, calculating the output power compensation of each power generating source;

wherein the emergency control method based on source-load-storage regulation and cutback further comprises: applying the output power compensation of each power generating source to adjust the output power of each power generating source, to thereby make each power generating source work based on the adjusted output power.

2. The emergency control method based on source-load-storage regulation and cutback according to claim 1, wherein the power generating sources in the power distribution network comprise micro-grids, photovoltaic power stations and wind power stations, and the power distribution network further comprises energy-storage power stations.

3. The emergency control method based on source-load-storage regulation and cutback according to claim 2, wherein response modes of the method comprise active response and passive response, the active response means that the power distribution network actively responds to a frequency fall under large disturbance in an island mode or a weakly-connected mode, and the passive response means that the power distribution network passively responds to an emergency control instruction issued by a major network in a grid-connected mode.

4. The emergency control method based on source-load-storage regulation and cutback according to claim 3, wherein in the active response mode of a source-grid-load-storage networked cloud decision control system, an actively calculated power gap required for stable operation of the system under an island condition is used as the power regulating quantity $\Delta P_{regulating\ quantity}$; and in the passive response mode of the source-grid-load-storage networked cloud decision control system, a power gap required for stable operation of the major network and issued by the major network is used as the power regulating quantity $\Delta P_{regulating\ quantity}$.

5. The emergency control method based on source-load-storage regulation and cutback according to claim 4, wherein the power gap required for stable operation of the system under the island condition is actively calculated according to the following formula:

$$\Delta P_{actively\ calculated\ power\ gap} = \Sigma_{a=1}^{x} \Delta P_{micro-grid\ a} + \Sigma_{j=1}^{y} \Delta P_{photovoltaic\ power\ station\ j} + E_{j=1}^{z} \Delta P_{wind\ power\ station\ i} + \Sigma_{b=1}^{m} \Delta P_{energy-storage\ power\ station\ b} \quad (1)$$

in formula (1), $\Sigma_{a=1}^{x} \Delta P_{micro-grid\ a}$ is an output power compensation of the micro-grids, and is expressed by the following formula:

$$\Sigma_{a=1}^{x} \Delta P_{micro-grid\ a} = \frac{\Sigma_{a=1}^{x} \Delta f}{k_{micro-grid\ a}} \quad (2)$$

in formula (2), x is the number of the micro-grids; y is the number of the photovoltaic power stations, z is the number of the wind power stations, m is the number of the energy-storage power stations; $\Sigma_{a=1}^{x} \Delta f$ is a difference between output frequency of the micro-grids and rated grid frequency, and $k_{micro-grid\ a}$ is a frequency regulation coefficient of the micro-grids;

in formula (1), $\Sigma_{j=1}^{y} \Delta P_{photovoltaic\ power\ station\ j}$ is an output power compensation of the photovoltaic power stations, and is expressed by the following formula:

$$\Sigma_{j=1}^{y} \Delta P_{photovoltaic\ power\ station\ j} = \frac{\Sigma_{j=1}^{y} \Delta f}{k_{photovoltaic\ power\ station\ j}} \quad (3)$$

in formula (3), $\Sigma_{a=1}^{x} \Delta f$ is the difference between the output frequency of the photovoltaic power stations and the rated grid frequency, and $K_{photovoltaic\ power\ station\ j}$ is a frequency regulation coefficient of the photovoltaic power stations;

in formula (1), $\sum_{j=1}^{z} \Delta P_{wind\ power\ station\ i}$ is an output power compensation of the wind power stations and is expressed by the following formula;

$$\sum_{i=1}^{z} \Delta P_{wind\ power\ station\ i} = \frac{\sum_{i=1}^{z} \Delta f}{k_{wind\ power\ station\ i}} \quad (4)$$

in formula (4), $\sum_{a=1}^{x} \Delta f$ is the difference between the output frequency of the wind power stations and the rated grid frequency, and $k_{wind\ power\ station\ i}$ is a frequency regulation coefficient of the wind power stations;

in formula (1), $\sum_{b=1}^{m} \Delta P_{energy-storage\ power\ station\ b}$ is an output power compensation of the energy-storage power stations, and is expressed by the following formula:

$$\sum_{b=1}^{m} \Delta P_{energy-storage\ power\ station\ b} = \frac{\sum_{b=1}^{m} \Delta f}{k_{energy-storage\ power\ station\ b}} \quad (5)$$

in formula (5), $\sum_{a=1}^{x} \Delta f$ the difference between the output frequency of the energy-storage power stations and the rated grid frequency, and $K_{energy-storage\ power\ station\ b}$ is a frequency regulation coefficient of the energy-storage power stations.

6. The emergency control method based on source-load-storage regulation and cutback according to claim 1, wherein the preset cutback principle is expressed as:

$$aload_f = \min_{d} |(P_{load\ d} - P_{load\ to\ be\ cut\ back})| \quad (6)$$

In formula (6), $aload_f$ is a load to be cut back, and $P_{load\ d}$ is power allocated to a $d^{th}$ load by the power distribution network, and $P_{load\ to\ be\ cut\ back}$ is the power of load to be cut back in the distribution network.

7. A source-grid-load-storage networked cloud decision control system, comprising a cloud intelligent analysis and decision platform, a source-grid-load-storage networked cooperative control system, and a source-grid-load-storage cooperative control intelligent terminal, wherein:

the cloud intelligent analysis and decision platform has a terminal connected to a power grid dispatching system and a terminal connected to the source-grid-load-storage networked cooperative control system, and the source-grid-load-storage networked cooperative control system is connected to the source-grid-load-storage cooperative control intelligent terminal;

wherein the source-grid-load-storage networked cloud decision control system comprises an active response mode, in the active response mode, the system actively responds to grid frequency/voltage disturbance and fault information to provide analysis and decision support by means of the cloud intelligent analysis and decision platform, and the source-grid-load-storage networked cooperative control system sends a decision command to the source-grid-load-storage cooperative control intelligent terminal;

wherein the source-grid-load-storage networked cloud decision control system further comprises a passive response mode, in the passive response mode, the system provide analysis and decision support by means of the cloud intelligent analysis and decision platform according to a management and regulation strategy issued by the power grid dispatching system, and the source-grid-load-storage networked cooperative control system sends a decision command to the source-grid-load-storage cooperative control intelligent terminal;

the source-grid-load-storage cooperative control intelligent terminal is connected to a distributed power unit, a distributed micro-grid unit, a distributed energy-storage device unit and a distributed load aggregation unit for executing a decision issued by the source-grid-load-storage cooperative control intelligent terminal;

wherein the source-grid-load-storage networked cooperative control system comprises an emergency regulation and cutback module, and the emergency regulation and cutback module is used to perform the steps of the method according to claim 1.

8. An emergency control method based on source-load-storage regulation and cutback, comprising:

obtaining a power regulating quantity $\Delta P_{regulating\ quantity}$, a total output power compensation of power generating sources in a power distribution network, and output power and an output frequency of each power generating source;

adjusting a grid frequency based on the power regulating quantity $\Delta P_{regulating\ quantity}$, the total output power compensation of the power generating sources in the power distribution network, and the output power and the output frequency of each power generating source to obtain an adjusted grid frequency; and supplying, by the power generating sources in the power distribution network, power based on the adjusted grid frequency;

wherein the adjusting a grid frequency comprises:
  increasing the grid frequency by:
    in response to the total output power compensation of the power generating sources in the power distribution network being greater than the power regulating quantity $\Delta P_{regulating\ quantity}$ and the output power and the output frequency of each power generating source being less than rated values of a power source, making the total output power compensation of the power generating sources participating in output power meet $\Delta P = \Delta P_{regulating\ quantity}$ according to a balance between supply and demand, and obtaining an output power compensation of each power generating source;

in response to the total output power compensation of the power generating sources in the power distribution network being greater than the power regulating quantity $\Delta P_{regulating\ quantity}$ and the output power of part of the power generating sources being greater than the rated value of the power source, limiting the output power of the power generating sources with the output power being greater than the rated value of the power source, and compensating a remaining power deficiency with standby energy-storage power stations, making a total output power compensation of the power generating sources participating in power output, excluding the power generating sources with output power being greater than the rated value of the power source, meet $\Delta P = \Delta P_{regulating\ quantity} - \Delta P_{out-of-limit\ power\ station}$ according to the balance between supply and demand, and obtaining the output power compensation of each power generating source;

in response to the total output power compensation of the power generating sources in the power distribution network being less than the power regulating quantity $\Delta P_{regulating\ quantity}$, using the standby energy-storage power stations to compensate a power deficiency of the power distribution network, making a total output power compensation of the power generating sources participating in power output and the standby energy-storage power stations meet $\Delta P = \Delta P_{regulating\ quantity}$ according to the balance between supply and demand, and obtaining the output power compensation of each power generating source;

in response to the total output power compensation of the power generating sources in the power distribution network being less than the power regulating quantity $\Delta P_{regulating\ quantity}$ and the balance between power supply and demand of the power distribution network being still not maintained after the standby energy-storage power stations are used to compensate the power deficiency, cutting back removable loads, making a total output power compensation of the power generating sources and the standby energy-storage power stations after load cutback meet $\Delta P = \Delta P_{regulating\ quantity} - \Delta P_{removable\ load\ f}$ according to the balance between supply and demand, and obtaining the output power compensation of each power generating source;

in response to the total output power compensation of the power generating sources in the power distribution network being less than the power regulating quantity $\Delta P_{regulating\ quantity}$ and the power deficiency of the power distribution network being still not made up by using the standby energy-storage power stations and cutting back removable loads, using an external power supply system to assist in making up the deficiency, making a total output power compensation of the power generating sources participating in power output, the standby energy-storage power stations and the external power supply system after load cutback meet $\Delta P = \Delta P_{regulating\ quantity} - \Sigma_{d=1}^{l} \Delta P_{removable\ load\ d}$ according to the balance between supply and demand, and obtaining the output power compensation of each power generating source;

decreasing the grid frequency by:

in response the total output power compensation of the power generating sources in the power distribution network being greater than the power regulating quantity $\Delta P_{regulating\ quantity}$ and the output power and output frequency of each power generating source being less than the rated values of the power source, making the total output power compensation of the power generating sources meet $\Delta P = \Delta P_{regulating\ quantity}$ according to the balance between supply and demand, and obtaining the output power compensation of each power generating source; and in response to the total output power compensation of the power generating sources in the power distribution network being greater than the power regulating quantity $\Delta P_{regulating\ quantity}$ and the output power of part of the power generating sources being greater than the rated value of the power source, cutting back the power generating sources with the output power being greater than the rated value of the power source, making a total output power compensation of the power generating sources participating in power output meet $\Delta P = \Delta P_{regulating\ quantity} - \Delta P_{out-of-limit}$ according to the balance between supply and demand, and obtaining the output power compensation of each power generating source.

* * * * *